United States Patent
Liu

(10) Patent No.: US 6,940,340 B2
(45) Date of Patent: Sep. 6, 2005

(54) NOISE-PROOF BUS CIRCUIT

(75) Inventor: Chao-Chin Liu, Taipei Hsien (TW)

(73) Assignee: Wistron Corporation, Taipei Hsien (TW)

(*) Notice: Subject to any disclaimer, the term of this patent is extended or adjusted under 35 U.S.C. 154(b) by 6 days.

(21) Appl. No.: 10/707,226

(22) Filed: Nov. 28, 2003

(65) Prior Publication Data
US 2005/0040877 A1 Feb. 24, 2005

(30) Foreign Application Priority Data
Aug. 20, 2003 (TW) .......................... 92122823 A

(51) Int. Cl.[7] .............. H03K 5/00; G06F 3/00
(52) U.S. Cl. ............... 327/551; 327/310; 710/14
(58) Field of Search ................. 327/551, 310, 327/180, 34; 375/257, 318; 710/3–4, 14

(56) References Cited

U.S. PATENT DOCUMENTS

| 4,320,521 A | * | 3/1982 | Balakrishnan et al. ...... 375/257 |
| 5,533,053 A | * | 7/1996 | Hershbarger ................ 375/257 |
| 5,933,799 A | * | 8/1999 | Kamiya ..................... 702/191 |
| 6,278,312 B1 | * | 8/2001 | Dabral et al. .............. 327/310 |
| 6,779,046 B1 | * | 8/2004 | Osuga ...................... 710/14 |

* cited by examiner

Primary Examiner—Dinh T. Le
(74) Attorney, Agent, or Firm—Winston Hsu

(57) ABSTRACT

A noise-free bus circuit for diminishing noises of an original clock signal over a bus. The noise-free bus circuit has a connection wire module and a voltage detection circuit. The connection wire module includes the bus and a conduction wire disposed along the bus. The bus has a first end connected to the original clock signal while the conduction wire has a first end connected to a reference voltage. The voltage detection circuit is electrically connected to second ends of the bus and the conduction wire for generating an amended clock signal by determining a voltage difference between voltages at the second ends of the bus and of the conduction wire, the amended clock signal being equivalently equal to the original clock signal without the noises.

19 Claims, 5 Drawing Sheets

NOISE-PROOF BUS CIRCUIT

BACKGROUND OF INVENTION

1. Field of the Invention

The present invention relates to a bus, and more particularly, to a noise-proof bus circuit capable of diminishing noises in a clock signal transmitted over the bus.

2. Description of the Prior Art

In an electronic circuit, a signal transmitted over a conduction line is vulnerable to noises. In general, if the signal is a data signal transmitted over a data bus, noises interfering the data signal are negligible in determining the data signal. However, if the signal is a clock signal transmitted over a clock bus, any glitch in the clock signal may malfunction the electronic circuit.

Please refer to FIG. 1, which is a waveform diagram showing waveforms of a noise-free clock signal $CLK_{org}$ and a noise-contaminated clock signal $CLK_{no}$ formed by contaminating the noise-free clock signal $CLK_{org}$ with noises during transmission according to the prior art. As part 1 of FIG. 1 shows, the noise-free clock signal $CLK_{org}$ is at first determined to trigger an electronic component at a rising edge at time $t_1$. The noise-free clock signal $CLK_{org}$, however, is contaminated with noises during transmission and is deformed into the noise-contaminated clock signal $CLK_{no}$ shown in part 2 of FIG. 1. Due to the triggering by the noise-contaminated clock signal $CLK_{no}$, the electronic component is triggered not only at the rising edge at time $t_1$, but also at another rising edges at time $t_2$ and $t_3$.

SUMMARY OF INVENTION

It is therefore a primary objective of the claimed invention to provide a noise-proof clock signal circuit for transmitting a clock signal free from noises.

According to the claimed invention, the noise-proof clock signal circuit is capable of diminishing noises in a clock signal transmitted over a bus, and the circuit has a conduction line module and a voltage detection circuit. The conduction line module includes the bus and a conduction line disposed along the bus, the bus having a first end for inputting the clock signal and the conduction line having a first end connected to a reference voltage. The voltage detection circuit is electrically connected to second ends of the bus and the conduction line of the conduction line module for generating an amended clock signal by determining a voltage difference between the second ends of the bus and the conduction line.

In an embodiment of the present invention, the conduction line is disposed in parallel with the bus.

It is an advantage of the claimed invention that a noise-proof clock signal circuit having the bus and the conduction line disposed in parallel with the bus is capable of transmitting a clock signal free from noises.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
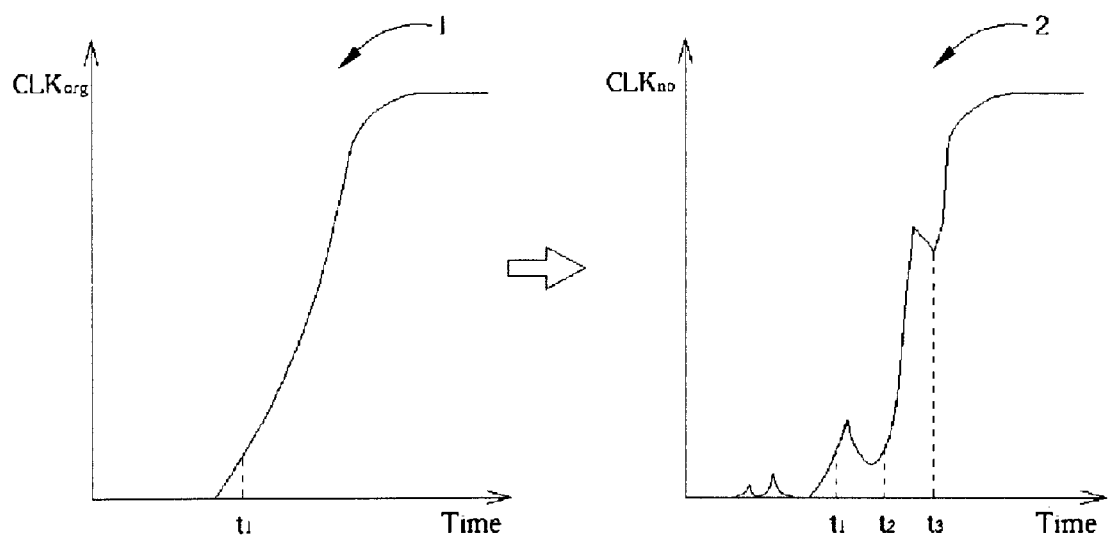
FIG. 1 is a waveform diagram showing waveforms of a noise-free clock signal and a noise-contaminated clock signal formed by contaminating the noise-free clock signal with noises during transmission according to the prior art.
Figure 2:
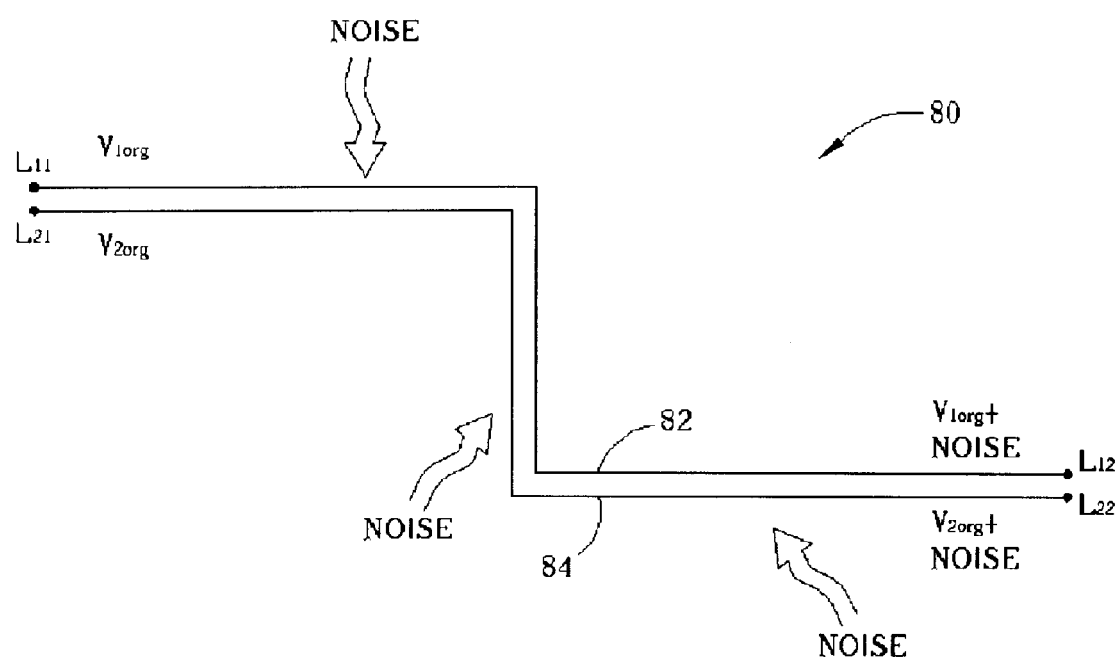
FIG. 2 is a schematic diagram of a conduction line module comprising two parallel-disposed conduction lines according to the present invention.

Please refer to FIG. 2, which is a schematic diagram of a conduction line module 80 comprising two parallel-disposed conduction lines 82 and 84 according to the present invention. As shown in FIG. 2, after being transferred respectively from first ends $L_{11}$ and $L_{21}$ (input ends) to second ends $L_{12}$ and $L_{22}$ (output ends) of the conduction lines 82 and 84, a first original signal $V_{1org}$ and a second original signal $V_{2org}$ are transformed into the first original signal $V_{1org}$+ a first noise signal $NOISE_1$ and the second original signal $V_{2org}$+ a second noise signal $NOISE_2$ respectively due to the interference by noise signals NOISE. Since the conduction lines 82 and 84 are parallel to each other, the first noise signal $NOISE_1$ and the second noise signal $NOISE_2$ respectively accumulated on the first original signals $V_{1org}$ and on the second original signal $V_{2org}$ are approximately identical. In other words, a first difference between the first original signal $V_{1org}$ at the first end $L_{11}$ of the conduction line 82 and the second original signal $V_{2org}$ at the first end $L_{21}$ of the second line 84 is almost equal to a second difference between (the first original signal $V_{1org}$+ the first noise signal $NOISE_1$) at the second end $L_{12}$ of the conduction line 82 and (the second original signal $V_{2org}$+ the second noise signal $NOISE_2$) at the second end $L_{22}$ of the conduction line 84. This is the principle that the present invention adopts to diminish noises in a clock signal transmitted over a bus.

Figure 3:
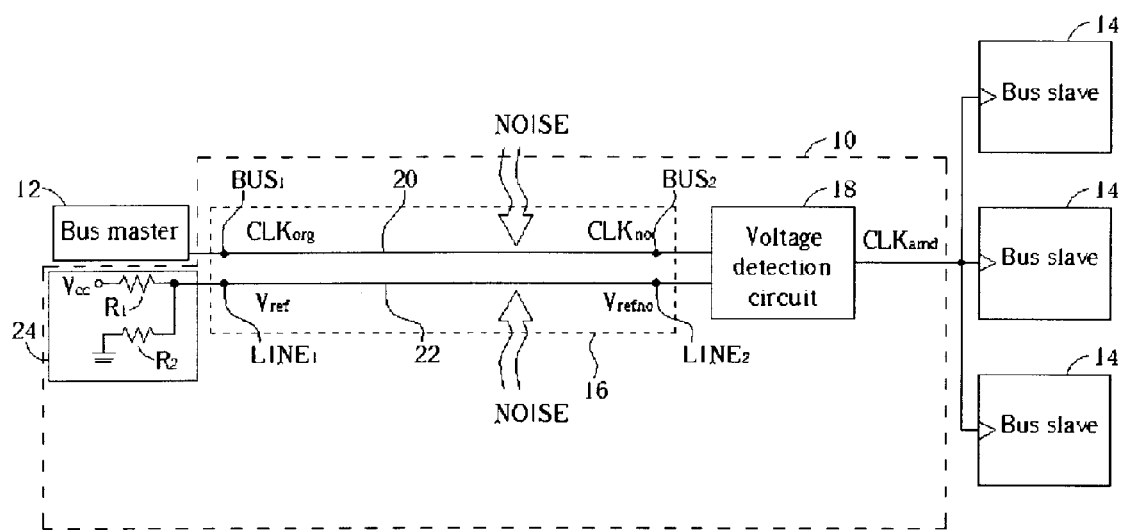
FIG. 3 is a function block diagram of a noise-proof clock signal circuit of a first embodiment according to the present invention.

Please refer to FIG. 3, which is a function block diagram of a noise-proof clock bus circuit 10 according to the present invention. The circuit 10 is for transferring an original clock signal $CLK_{org}$ output from a bus master 12 via a bus 20 to a bus slave 14. In a process of being transferred from the bus master 12 via the bus 20 to the bus slave 14, the original clock signal CLKorg is likely contaminated with the noise signals NOISE and is deformed into a noise-contaminated clock signal $CLK_{no}$ at a second end $BUS_2$ of the bus 20. However, the circuit 10 is capable of diminishing the noise signals NOISE contaminated to the original clock signal $CLK_{org}$ and ensures the bus slave 14 to receive an amended clock signal $CLK_{amd}$ free of any noises including the noise signals NOISE.

The circuit 10 comprises a conduction line module 16, a voltage detection circuit 18 and a reference circuit 24 for generating a reference voltage $V_{ref}$. The conduction line module 16 comprises bus 20 and a conduction line 22 disposed along the bus 20. The original clock signal $CLK_{org}$ from the bus master 12 is input to the first end $BUS_1$ of the bus 20. The conduction line 22 has a first end $LINE_1$ connected to the reference circuit 24 for inputting the reference voltage $V_{ref}$. The bus 20 has a second end $BUS_2$ connected to the voltage detection circuit 18. The conduction line 22 also has a second end $LINE_2$ connected to the voltage detection circuit 18. The detection circuit 18 is disposed on a region near the second end $BUS_2$ of the bus 20 (also near the second end $LINE_2$ of the conduction line 22) for generating the amended clock signal $CLK_{amd}$ by determining a voltage difference between a noise-contaminated clock signal $CLK_{no}$ on the second end $BUS_2$ of the bus 20 and a noise-contaminated reference voltage $V_{refno}$ on the second end $LINE_2$ of the conduction line 22.

In an embodiment of the present invention, the bus 20 can be a smart bus (SMBUS), the bus master 12 can be a south bridge circuit or a keyboard controller (KBC), the bus slave 14 can be a memory module, a clock generator or a peripheral device, the conduction line 22 is disposed in parallel with the bus 20, the voltage detection circuit 18 can be a comparator for outputting the amended clock signal $CLK_{amd}$ when the noise-contaminated clock signal $CLK_{no}$ is greater than the noise-contaminated reference voltage $V_{refno}$, and the reference circuit 24 can comprise a first resistor $R_1$ and a second resistor $R_2$ connected in series with the first resistor $R_1$. The first resistor $R_1$ has a first end connected to a first voltage $V_{cc}$ and a second end connected to the first end $LINE_1$ of the conduction line 22. The second resistor $R_2$ has a first end connected to a second voltage GND and a second end connected to the first end $LINE_1$ of the conduction line 22.

Although the original clock signal $CLK_{org}$ is likely contaminated and deformed by the noise signals NOISE during transmission from the first end $BUS_1$ of the bus 20 via the bus 20 to the second end $BUS_2$ of the bus 20, the noise signals the reference signal $V_{ref}$ on the first end $LINE_1$ of the conduction line 22 has suffered during transmission to the second end $LINE_2$ of the conduction line 22 is almost equal to noise signals the original clock signal $CLK_{org}$ has suffered (as described previously, a first difference between first ends of two parallel-disposed conduction lines is almost to a second difference between second ends of the parallel-disposed conduction lines), so the variance relation between noise-contaminated reference voltages respectively on the two second end $BUS_2$ of the bus 20 and the second end $LINE_2$ is identical to that between the original clock signal $CLK_{org}$ on the first end $BUS_1$ of the bus 20 and the reference voltage $V_{ref}$ on the first end $LINE_1$ of the conduction line 22. In equivalence, the voltage detection circuit 18 disposed on a region near the second end $BUS_2$ of the bus 20 (the second end $LINE_2$ of the conduction line 22) for generating the amended clock signal $CLK_{amd}$ by determining the voltage difference between the noise-contaminated clock signal $CLK_{no}$ and the noise-contaminated reference voltage $V_{refno}$ can be deemed as another voltage detection circuit disposed on another region near the first end $BUS_1$ of the bus 20 (the first end $LINE_1$ of the conduction line 22) still capable of generating the amended clock signal $CLK_{amd}$ according to the original clock signal $CLK_{org}$ and the reference voltage $V_{ref}$ instead, as if the original clock signal $CLK_{org}$ during transmission over the bus 20 does not contaminate any noises.

Figure 4:
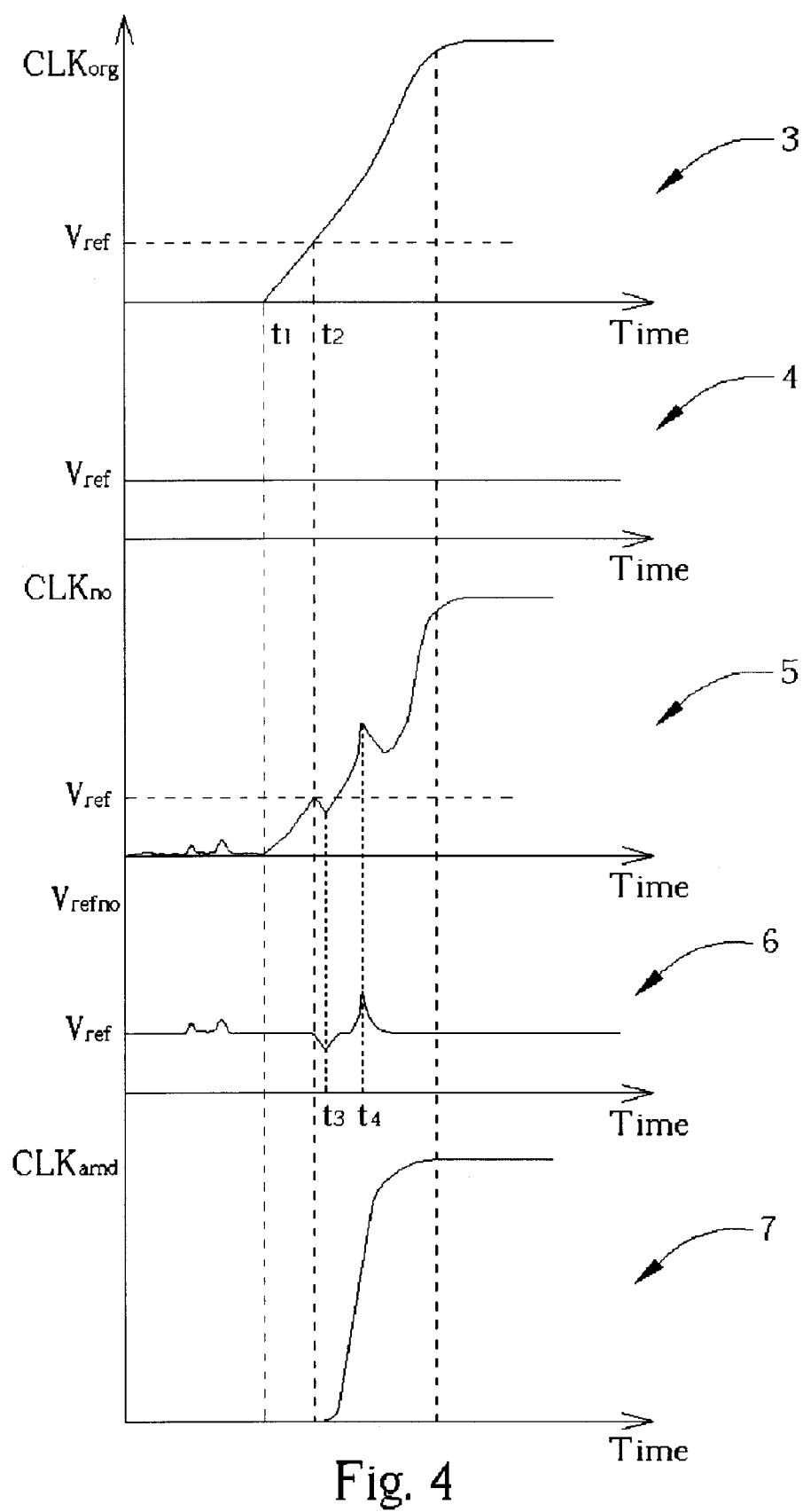
FIG. 4 is a waveform diagram showing waveforms of signals transmitted over the circuit shown in FIG. 3 according to the present invention.

Please refer to FIG. 4, which is a waveform diagram showing waveforms of the original clock signal $CLK_{org}$, the reference voltage $V_{ref}$, the noise-contaminated clock signal $CLK_{no}$, the noise-contaminated reference voltage $V_{refno}$, and the amended clock signal $CLK_{amd}$. As parts 3 and 4 of FIG. 4 show, the bus master 12 and the reference circuit 24 output the original clock signal $CLK_{org}$ and the reference voltage $V_{ref}$ both of which are contaminated with no noises, at the first end $BUS_1$ of the bus 20 and the first end $LINE_1$ of the conduction line 22 respectively. After being transferred by the conduction line module 16, the noise-contaminated clock signal $CLK_{no}$ on the second end $BUS_2$ of the bus 20 and the noise-contaminated reference voltage $V_{refno}$ on the second end $LINE_2$ of the conduction line 22 are contaminated with the noise signals NOISE respectively, as shown in parts 5 and 6 of the FIG. 4, time and size for the noise signals NOISE to contaminate to the noise-contaminated clock signal $CLK_{no}$ identical to those for the noise signals NOISE to contaminate to the noise-contaminated reference voltage $V_{refno}$. In conclusion, the voltage detection circuit 18, functioning as a comparator, only cares about the relation between the noise-contaminated clock signal $CLK_{no}$ and the noise-contaminated reference voltage $V_{refno}$ (whether or not the noise-contaminated clock signal $CLK_{no}$ is greater than the noise-contaminated reference voltage $V_{refno}$ at any certain time), and ignores what values they really have. In the circuit 10 of the present invention, the reference circuit 24 for generating the reference voltage $V_{ref}$ can be realized by an operational amplifier, and the voltage detection circuit 18 can be realized by an operational amplifier or a subtractor, instead of the comparator.

The conduction line module 16 of the circuit 10 in an embodiment of the present invention comprises the SMBUS, which comprises only one single line. However, the conduction line module 16 can contain another type of bus comprising a plurality of lines more than one line. The conduction line module 16 in the mean time has to contain a plurality of conduction lines corresponding to the plurality lines of the bus. The voltage detection circuit 18 has to contain, of course, a plurality of corresponding comparators.

The conduction line module 16 shown in FIG. 3 comprises only one conduction line, the conduction line 22 disposed along the bus 20. In general, noises from the bus 20 side on the conduction line module 16 is approximately equal to noises from the conduction line 22 side on the conduction line module 16. However, in some circumstances, these two noises are different from each other, resulting that noises accumulated on the second end $BUS_2$ of the bus 20 are slightly different from noises accumulated on the second end $LINE_2$ of the conduction line 22. Another noise-proof bus signal 50 is disclosed to overcome this problem. Please refer to FIG. 5, which is a function block diagram of the circuit 50 of a second embodiment according to the present invention. In contrast to the circuit shown in FIG. 3, the circuit 50 further comprises a voltage averaging circuit 52, and a conduction line module 56 containing a conduction line 54 disposed along the bus 20 in addition to the conduction line 22. The conduction lines 22 and 54 are disposed on two opposite sides of the bus 20 respectively. The voltage averaging circuit 52 comprises an adder 58 for adding the noise-contaminated reference signals $V_{no1}$ and $V_{no2}$ respectively on the second ends of the conduction lines 22 and 54, and a divider 60 for dividing an output signal of a sum of the noise-contaminated reference voltages $V_{no1}$ and $V_{no2}$ by two. In other words, the voltage averaging circuit 52 is for calculating an arithmetic mean voltage of the noise-contaminated reference voltages $V_{no1}$ and $V_{no2}$. Therefore, the voltage detection circuit 18 can generate the amended clock signal $CLK_{amd}$ according to the arithmetic mean voltage and the noise-contaminated clock signal $CLK_{no}$.

Figure 5:
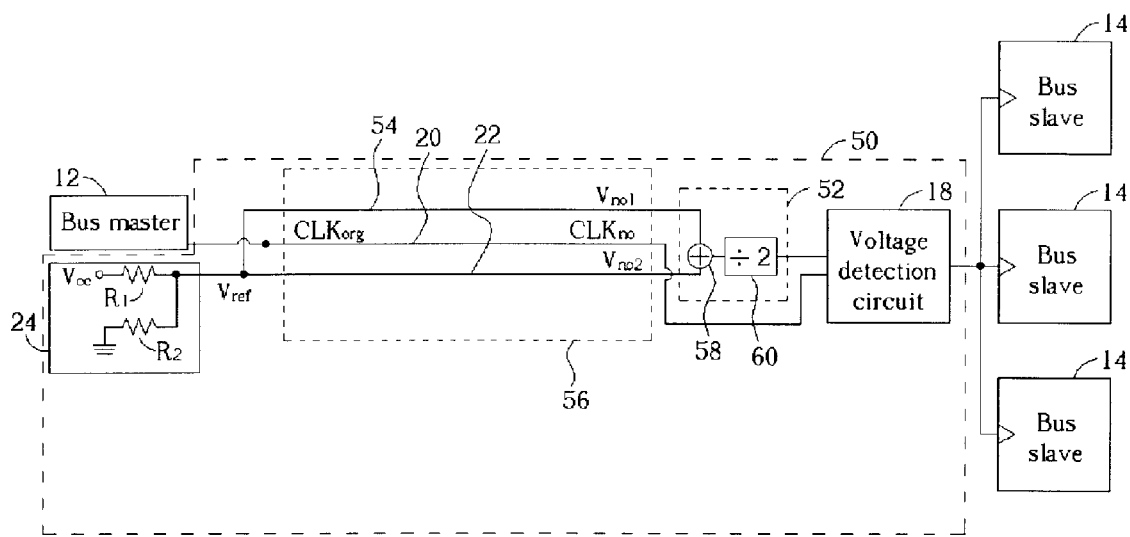
FIG. 5 is a function block diagram of a noise-proof clock signal circuit of a second embodiment according to the present invention.

Only two conduction lines 22 and 54 are shown in FIG. 5. However, the present invention can also provide a noise-proof bus circuit comprising a plurality of conduction lines all disposed along the bus and a voltage averaging circuit for calculating an arithmetic mean voltage of voltages output from all of output ends of these conduction lines to generate the amended clock signal $CLK_{amd}$ according to the arithmetic mean voltage and the noise-contaminated clock signal $CLK_{no}$.

In contrast to the prior art, the present invention can provide a noise-proof clock signal circuit comprising a bus, a conduction line disposed in parallel with the bus, and a voltage detection circuit. No matter how long the original clock signal $CLK_{org}$ has been transferred and how far the original clock signal $CLK_{org}$ has been contaminated, the voltage detection circuit still can generate the glitch-free amended clock signal $CLK_{amd}$ equivalently by determining the relation between the original clock signal $CLK_{org}$ and the reference voltage $V_{ref}$ dynamically. The noise-proof clock signal circuit of the present invention therefore has the ability to eliminate noises accumulated on the original clock signal $CLK_{org}$.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A noise-proof clock signal circuit capable of diminishing noises in a clock signal transmitted over a bus, the circuit comprising:

a conduction line module comprising the bus and at least a conduction line disposed along the bus, the bus having a first end for inputting the clock signal, and each of the conduction lines having a first end connected to a reference voltage;

a voltage averaging circuit having input ends connected to second ends of the conduction lines for generating an arithmetic mean voltage of voltages at the second ends of the conduction line and an output end for outputting the arithmetic mean voltage; and a voltage detection circuit electrically connected to a second end of the bus and the output end of the voltage averaging circuit for generating an amended clock signal by determining a voltage difference between the arithmetic mean voltage and a voltage at the second end of the bus.

2. The circuit of claim 1 wherein each of the conduction lines is disposed in parallel with the bus.

3. The circuit of claim 1 wherein the conduction lines comprise two conduction lines respectively disposed on two opposite sides of the bus.

4. The circuit of claim 1 wherein the reference voltage is generated from a reference circuit.

5. The circuit of claim 4 wherein the reference circuit comprises a first resistor and a second resistor connected in series with the first resistor, the first resistor having a first end connected to a first voltage and a second end connected to the first end of the conduction line, and the second resistor having a first end connected to a second voltage and a second end connected to the first end of the conduction line.

6. The circuit of claim 1 wherein the voltage detection circuit comprises an operational amplifier.

7. The circuit of claim 1 wherein the clock signal is generated from a bus master.

8. The circuit of claim 7 wherein the bus master is a south bridge circuit.

9. The circuit of claim 7 wherein the bus master is a keyboard controller.

10. The circuit of claim 1 wherein the amended clock signal is transmitted to a bus slave.

11. The circuit of claim 10 wherein the bus slave is a memory module.

12. The circuit of claim 1 wherein the bus is a smart bus (SMBUS).

13. The circuit of claim 10 wherein the bus slave is a clock generator.

14. The circuit of claim 10 wherein the bus slave is a peripheral device.

15. A method for diminishing noises in a clock signal transmitted over a bus, the method comprising:

inputting the clock signal to an input end of the bus;

providing at least a conduction line disposed along the bus, each of the conduction lines having an input end connected to a reference voltage;

calculating an arithmetic mean voltage of voltages at output ends of the conduction lines; and outputting an amended voltage by determining a voltage difference between the arithmetic mean voltage and a voltage at an output end of the bus.

16. The method of claim 15 wherein the conduction lines all are disposed in parallel with the bus.

17. The method of claim 15 wherein the conduction lines comprise two conduction lines respectively disposed on two opposite sides of the bus.

18. The method of claim 15 wherein the bus is a SMBUS.

19. The method of claim 15 wherein the clock signal is generated from a bus master and the amended clock signal is transmitted to a bus slave.

* * * * *